United States Patent [19]

Chivens et al.

[11] Patent Number: 4,714,508

[45] Date of Patent: Dec. 22, 1987

[54] FIXTURE AND METHOD FOR MAKING SPIRAL WOUND HOSE

[75] Inventors: Donald R. Chivens, Northridge; Paul Greskovics, Manhattan Beach, both of Calif.

[73] Assignee: Alopex Industries, Inc., San Marcos, Calif.

[21] Appl. No.: 843,509

[22] Filed: Mar. 25, 1986

[51] Int. Cl.⁴ ............................................. B23K 27/00
[52] U.S. Cl. ...................... 156/195; 156/272.8; 156/275.1; 219/121 LM; 219/121 LD; 219/121 LE
[58] Field of Search .................. 156/272.8, 195, 275.1, 156/143; 219/121 LM, 121 LC, 121 LE

[56] References Cited

U.S. PATENT DOCUMENTS

| | | | |
|---|---|---|---|
| 2,722,263 | 11/1955 | Beare et al. | |
| 2,731,040 | 1/1956 | Warburton . | |
| 2,994,104 | 8/1961 | Mittag . | |
| 3,122,171 | 10/1960 | Britton et al. . | |
| 3,199,541 | 8/1965 | Richitelli . | |
| 3,255,780 | 6/1966 | Squirrell . | |
| 3,273,600 | 9/1966 | Swan . | |
| 3,477,891 | 11/1969 | Hawerkamp . | |
| 3,495,628 | 9/1965 | Boender | 138/154 X |
| 3,542,078 | 11/1970 | Lykle . | |
| 3,554,237 | 1/1971 | Pelley . | |
| 3,606,670 | 9/1971 | Wienard et al. . | |
| 3,607,501 | 9/1971 | Okumura . | |
| 3,679,531 | 7/1972 | Wienard et al. . | |
| 3,815,639 | 6/1974 | Westerbarkey . | |
| 3,846,202 | 11/1974 | Clarke . | |
| 3,872,983 | 3/1975 | Roberts | 138/121 |
| 3,890,181 | 6/1975 | Stent et al. . | |
| 3,966,525 | 6/1976 | Steward . | |
| 3,974,016 | 8/1976 | Bondybey et al. | 156/272.8 |
| 3,997,385 | 12/1976 | Osborne | 156/272.8 |
| 4,029,535 | 6/1977 | Cannon et al. | 156/275.1 X |
| 4,062,380 | 12/1977 | Hofle . | |
| 4,119,123 | 10/1978 | Samuels | 138/122 |
| 4,121,624 | 10/1978 | Chen | 138/122 |
| 4,149,924 | 4/1979 | Grobard . | |
| 4,203,476 | 5/1980 | Vitellaro . | |
| 4,209,043 | 6/1980 | Menzel . | |
| 4,224,965 | 9/1980 | Suchor . | |
| 4,233,097 | 11/1980 | Stahl . | |
| 4,279,965 | 7/1981 | Elmqvist | 138/154 X |
| 4,291,728 | 9/1981 | Cothran . | |
| 4,294,636 | 10/1981 | Vitellaro | 156/195 X |
| 4,308,082 | 12/1981 | Menzel . | |
| 4,310,946 | 1/1982 | Baker et al. | 156/143 X |
| 4,337,564 | 7/1982 | Menzel et al. . | |
| 4,337,800 | 7/1982 | Carlson et al. . | |
| 4,362,187 | 12/1982 | Harris et al. . | |
| 4,375,381 | 3/1983 | Carlson et al. | 156/195 |
| 4,377,186 | 3/1983 | Genini et al. . | |
| 4,383,555 | 5/1983 | Finley . | |
| 4,420,019 | 12/1983 | Dillon . | |
| 4,427,485 | 1/1984 | Kutnyak et al. | 156/195 X |
| 4,435,460 | 3/1984 | Menzel . | |
| 4,466,854 | 8/1984 | Hawerkamp . | |
| 4,471,813 | 9/1984 | Cothran . | |
| 4,486,260 | 12/1984 | Schaefer | 156/195 X |
| 4,486,484 | 12/1984 | Schafer . | |
| 4,487,232 | 12/1984 | Kanao . | |
| 4,490,200 | 12/1984 | Dillon . | |
| 4,501,948 | 2/1985 | Yampolsky et al. | 219/121 LC |
| 4,510,013 | 4/1985 | Lupke et al. . | |

Primary Examiner—David Simmons
Attorney, Agent, or Firm—Kelly, Bauersfeld & Lowry

[57] ABSTRACT

An improved fixture and related method are provided for making spiral wound hose from elongated strips of thermoplastic material. The fixture includes feed rollers for spirally winding inner and outer interlocking strips from opposite directions onto a rotating mandrel. As the strips are wound together, a laser integrally fuses the strips to each other along a continuous line of contact to form an elongated hose. Rotating channeled guide rollers are spaced circumferentially about the mandrel to advance the formed hose continuously off the mandrel.

8 Claims, 4 Drawing Figures

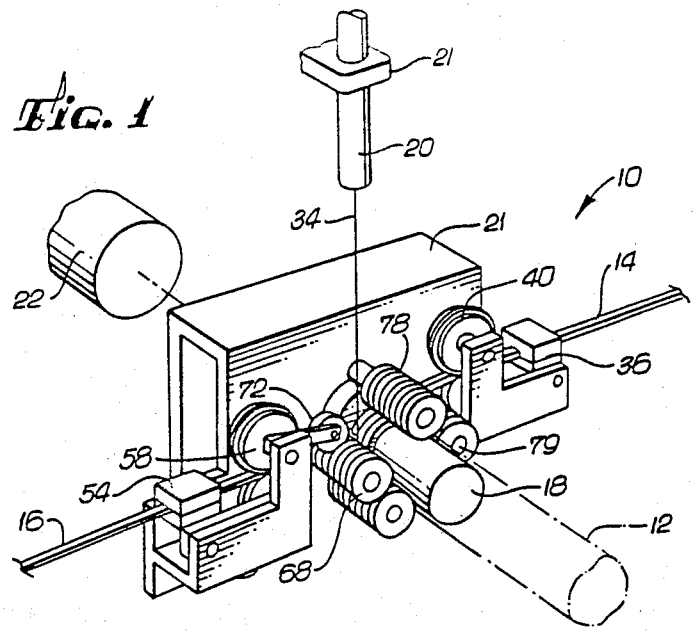
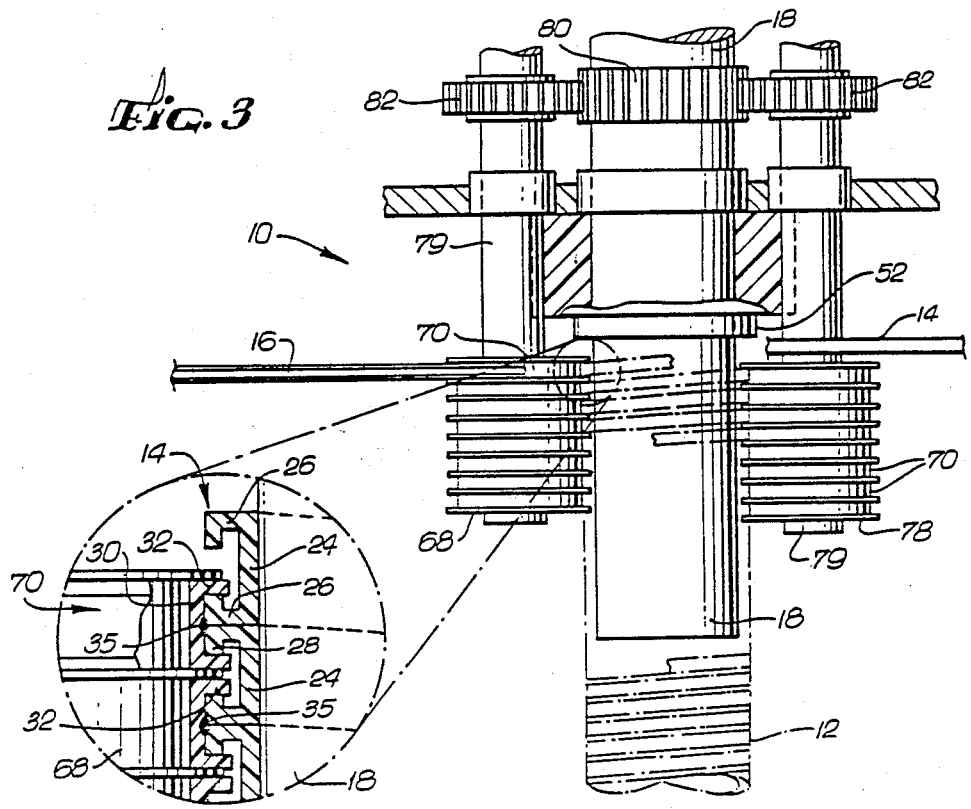

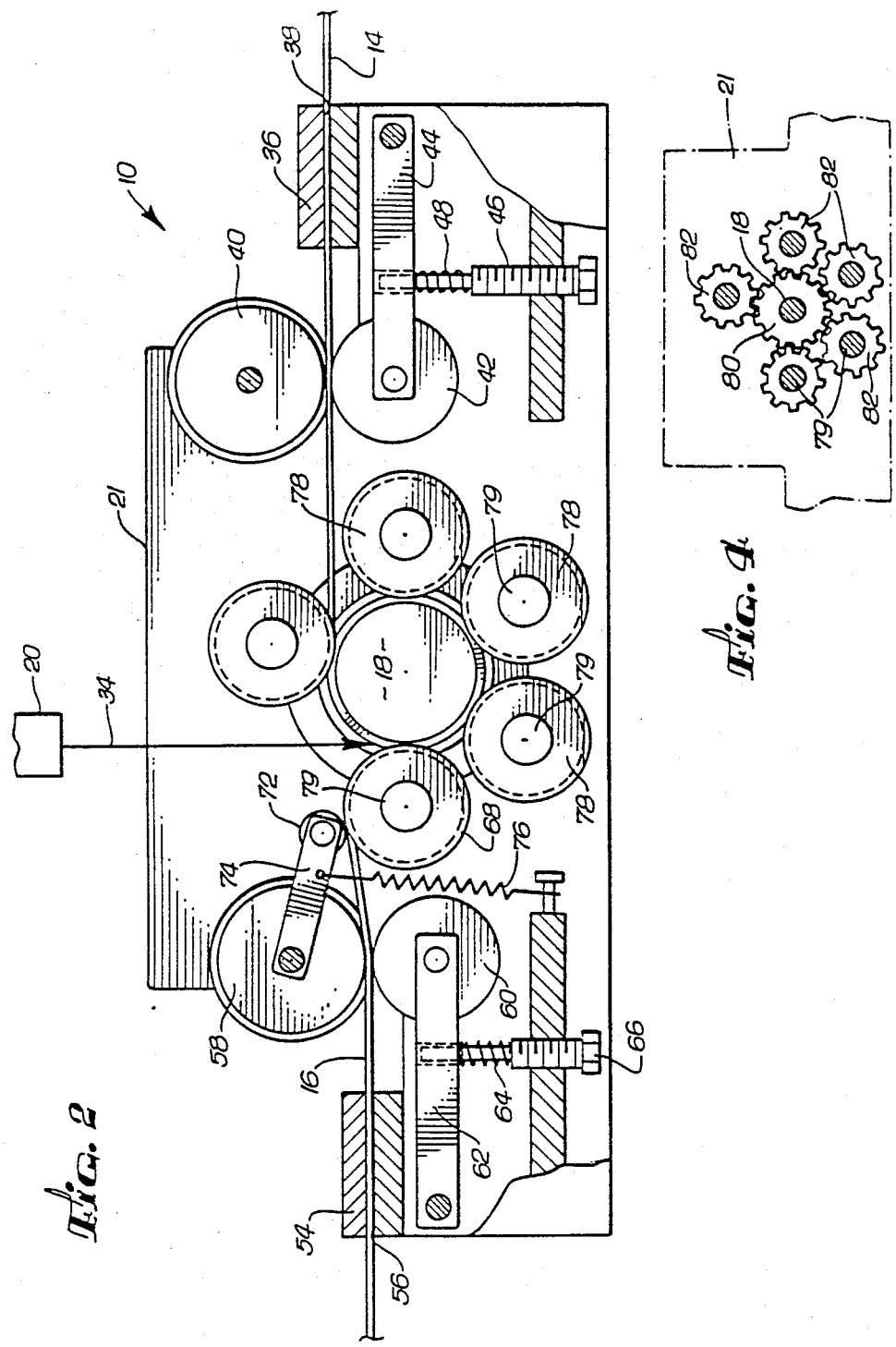

FIXTURE AND METHOD FOR MAKING SPIRAL WOUND HOSE

BACKGROUND OF THE INVENTION

This application includes subject matter related to the subject matter disclosed and claimed in copending application Ser. No. 798,978, filed Nov. 18, 1985.

This invention relates generally to apparatus and method for manufacturing plastic spiral wound hose. More particularly, this invention relates to an improved hose-making fixture and process for making spiral wound hose from overlapping and interlocking thermoplastic strips secured permanently to each other.

Plastic hoses in general are well known in the art for use in a wide variety of hose applications. In one common form, plastic hose is constructed from one or more elongated strips of a thermoplastic material wound spirally onto a mandrel with overlapping or interlocking turns. The adjacent turns are connected to each other by an appropriate bonding substance such as an adhesive material which may include some heated thermoplastic material corresponding with the elongated strip or strips. The resultant product is an elongated, lightweight, and relatively flexible plastic hose having broad utility for conveying fluids. For example, such spiral wound hoses are widely used for household vacuum cleaners, swimming pool cleaner devices, and the like.

In some applications, however, previous spiral wound hoses have not provided the desired longevity and/or capability to withstand normal operating temperatures or pressures without failure. More specifically, spiral wound hoses have been proposed for use with in-the-water swimming pool cleaners of the general type disclosed, for example, in U.S. Pat. Nos. 3,972,339 and 4,558,479. In cleaner devices of this type, the cleaner device and the hose remain in the pool water for extended time periods, with water under pressure being pumped through the hose to the cleaner device for a few hours each day thereby driving the cleaner device to perform desirable cleaning functions. However, in this environment, spiral wound hoses have experienced premature failure particularly at the adhesive interface between adjacent strip turns, resulting in substantial hose leakage and improper or failed pool cleaner operation. Such hose failures apparently have been due to the combined effects of prolonged exposure to sun and pool chemicals, and further seem to be most prevalent when water temperature is relatively warm, such as above about 85 degrees Fahrenheit. Accordingly, in the past, such pool cleaner devices have typically been provided with continuously extruded-type hoses which generally do not provide the requisite buoyancy and flexibility for optimum performance of the cleaner device.

There exists, therefore, a significant need for an improved method and related apparatus for making spiral wound plastic hose for use with swimming pool cleaner devices and in other hose applications. The present invention fulfills this need and provides further related advantages.

SUMMARY OF THE INVENTION

In accordance with the invention, an improved apparatus and method are provided for making spiral wound plastic hose. The invention includes an improved hose-making fixture for spiral winding of one or more elongated thermoplastic strips onto a mandrel and for continuously and integrally laser-fusing adjacent strip turns to each other along an uninterrupted line of contact to form an elongated spiral wound hose.

According to a preferred form of the invention, the improved fixture comprises a fixture frame supporting a rotatable mandrel and means for driving said mandrel about its own axis. Feed rollers supported from the frame on opposite sides of the mandrel are provided for respectively feeding an inner plastic strip and an outer plastic strip from opposite directions for spiral winding onto the mandrel. In the preferred form, the inner strip has a generally U-shaped configuration and is conveyed by the feed rollers over the mandrel in an upwardly open orientation for spiral winding onto the mandrel in a radially outwardly open geometry. The outer strip also has a generally U-shaped configuration and is conveyed in an upwardly open state for spiral winding about the inner strip with a radially inwardly open geometry overlapping and interlocking with adjacent turns of the inner strip. A laser is focused upon overlapping the juncture of adjacent inner strip turns and the outer strip as they are wound together to fuse said strips permanently along a continuous line of contact to form the spiral wound hose.

The fixture includes means for advancing the formed hose continuously and smoothly along the mandrel, thereby permitting continued winding and laser-fusion of the inner and outer strips. In this regard, the preferred fixture includes a plurality of externally channeled guide rollers at circumferentially spaced positions about the mandrel. These guide rollers are rotably driven along with the mandrel and assist in advancing the formed hose along the mandrel.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating, somewhat in schematic form, an improved hose-making fixture and related method embodying the invention;

FIG. 2 is an enlarged fragmented front elevational view depicting the fixture of FIG. 1;

FIG. 3 is a fragmented top plan view of the fixture of FIG. 1, with a portion thereof depicted in enlarged horizontal section; and FIG. 4 is a soemwhat schematic rear elevational view of the fixture.

DETAILED DESCRIPTION OF THE PREFERRED EMBODIMENT

As shown in the exemplary drawings, an improved fixture referred to generally by the reference numeral 10 is provided for use in making spiral wound plastic hose 12. The fixture 10 includes means for spirally winding one or more plastic strips, with inner and outer strips 14 and 16 being depicted in FIG. 1, onto a mandrel 18. A laser 20 is provided for permanently bonding adjacent strip turns on the mandrel along a continuous line of contact to form a lightweight and highly flexible spiral wound hose.

The hose-making fixture 10 of the present invention provides a relatively simple apparatus and method for manufacturing high strength spiral wound plastic hose at a relatively high production rate. The laser-fused adjacent turns of the wound plastic strips 14 and 16 are permanently and integrally joined to each other to enable the hose to withstand relatively high pressure and other hostile environmental conditions without early rupture. In particular, the fixture 10 and its related method of use are adapted to make highly flexible and lightweight spiral wound hose for use with in-the-pool swimming pool cleaner devices as exemplified, for example, in U.S. Pat. Nos. 3,972,339 and 4,558,479.

As shown in the drawing FIGS. 1-4, the hose-making fixture 10 includes a stationary frame 21 supporting the mandrel 18 for rotation about its own axis. One end of the mandrel 18 projects rearwardly from the frame 21 for appropriate connection in any suitable manner to a drive motor 22 for rotatably driving the mandrel, whereas the other mandrel end projects forwardly a short distance from the frame prior to termination. The outside diameter of the mandrel portion projecting forwardly from the frame is chosen to correspond generally with the inside diameter of a hose to be manufactured, as will be described.

The inner and outer plastic strips 14 and 16 are wound onto the mandrel 18 in a spiral, overlapping and interlocking manner to form the hose 12. These plastic strips are each formed from elongated thermoplastic material as by extruding or the like, with polyethylene being preferred for use in swimming pool cleaner applications due to its inherent buoyancy and lightweight flexibility characteristics. However, it will be understood that a wide variety of thermoplastic materials and compositions may be used in accord with the desired physical characteristics of the hose to be manufactured.

In one preferred form, the inner plastic strip 14 has a generally U-shaped configuration as shown best in the enlarged portion of FIG. 3. This strip geometry includes a central web 24 joined at its opposite ends to a pair of generally parallel ribs 26 which in turn carry a respective pair of short lips 28 turned toward each other at the distal ends of said ribs 26. The inner strip 14 is drawn from a supply reel or the like (not shown) for winding in a radially outwardly open orientation and with the ribs 26 in closely abutting, back-to-back relation with the ribs 26 of adjacent spiral turns.

Each back-to-back pair of ribs 26 on adjacent turns of the inner strip 14 defines a base onto which the outer strip 16 is wound spirally to provide a cap therefor. More particularly, as shown best in FIG. 3, the preferred outer strip 16 also has a generally U-shaped configuration defined by an outboard wall 30 joined at opposite ends to a pair of relatively short and generally parallel legs 32. The outer strip 16 is also drawn from a supply reel or the like (not shown) for spiral winding about the mandrel, but with the outboard wall 30 wrapped in overlying relation with the back-to-back pairs of ribs 26 on adjacent turns of the inner strip 14. The outer strip legs 32 extend radially inwardly from the wall 30 in axially outboard positions with respect to the lips 28 of the underlying ribs 26 whereby the outer strip 16 is wrapped in interlocking relation with the inner strip 14. Importantly, as the strips are wrapped together at one side of the mandrel 18, the three-component juncture between the back-to-back ribs 26 and the outboard wall 30 is upwardly exposed (FIGS. 1 and 2) to a fusing laser beam 34 generated by the laser 20 mounted on the frame 21 or other suitable support structure. The laser beam permanently welds or bonds the three-component juncture with a weld joint 35 to provide an integral and high strength connection.

The fixture 10 includes feed means for controlling and guiding supply of the inner and outer strips 14 and 16 as they are wound onto the mandrel, together with guide means for advancing the wound strips along the mandrel in an axial direction away from the laser beam 34. Accordingly, the strips can be wound continuously onto the mandrel and laser-welded together along a continuous line of contact to form the high strength hose 12 at a relative high production rate.

More specifically, as shown best in FIGS. 1 and 2, one exemplary feed means for the inner strip 14 comprises a guide block 36 mounted on the frame 21 at one side of the mandrel 18 and having a passage 38 therein through which the strip 14 is drawn. From the guide block 36, the inner strip is drawn further between a pair of channeled feed rollers 40 and 42. The lower feed roller 42 is conveniently supported at the end of a frame-mounted pivot arm 44. An adjustment screw 46 threaded into the frame 21 carries a compression spring 48 to apply an adjustable spring force urging the pivot arm 44 and thus also the lower feed roller 42 upwardly against the inner strip 14 to insure accurate guiding thereof.

From the feed rollers 40 and 42, the inner strip passes with an upwardly open geometry (FIG. 1) over the mandrel 18 and axially in front of a stationary die block 52. This die block 52 has a generally cylindrical shape supported from the frame in surrounding relation with the mandrel 18. The die block 52 assists in guiding the inner strip 14 for winding onto the mandrel.

The outer strip 16 is drawn for winding onto the mandrel in a similar manner but from the opposite lateral direction to insure upward exposure of the three-component juncture when the strips are wound together. In particular, an exemplary feed means for the outer strip 16 includes a frame-mounted guide block 54 having an opening 56 therein for the strip passage. The outer strip is then drawn further through a pair of channeled feed rollers 58 and 60, with the lower roller 60 again being preferably carried on a frame-mounted pivot arm 62 urged with a selected spring force toward the strip 16 by a compression spring 64 variably set by an adjustment screw 66. The strip 16 then passes over a guide roller 68 through an open rear channel 70 therein for winding about the inner strip 14 and the mandrel 18. A pressure roller 72 carried by another pivot arm 74 is conveniently drawn by a spring 76 downwardly upon the outer strip 16 to seat the strip securely into the guide roller rear channel 70, thereby insuring accurate alignment of the outer strip as it is wound over the inner strip.

The guide roller 68 is associated with a plurality of additional guide rollers 78 each oriented generally in parallel with the mandrel 18 at circumferentially spaced positions about the mandrel. Each guide roller includes an axially spaced succession of channels 70 located in accordance with the spiral lead angle of the outer strip 16 for engaging and guiding the outer strip at downstream axial positions from the laser welding site. These guide rollers are supported on individual spindles and rotatably driven in synchronism and in opposite rotational directions from the mandrel by means of driven gears 80 (FIGS. 3 and 4) meshed with a drive gear 82 on the mandrel at the rear side of the frame 21. The guide rollers thus perform the dual functions of guiding and advancing the formed hose along the mandrel on a continuous production basis.

The improved fixture 10 and its related method of use thus provide a relatively simple apparatus and method for producing spiral wound hose 12. The speed of mandrel rotation can be selectively controlled to correspondingly govern hose production rate. Moreover, the laser 20 can be selected from a variety of industrial purpose lasers and power ranges, with the laser beam 34 being typically slightly defocused to insure a weld joint 35 overlapping the three-component juncture. In one working embodiment, a carbon dioxide laser is contemplated with a power range of about 800–1000 watts for welding polyethylene strips at a production rate controlled in part by the particular power setting. The resultant laser-welded hose 12 has been found to be highly satisfactory particularly for swimming pool applications wherein resistance to deterioration from exposure to sun, pool water, and temperature variations is required.

A variety of modifications and improvements to the invention described herein are believed to be apparent to those skilled in the art. Accordingly, no limitation on the invention is intended by way of the description herein, except as set forth in the appended claims.

What is claimed is:

1. A method of making spiral wound hose, comprising the steps of:

spirally winding an inner strip of thermoplastic material onto a mandrel, the inner strip having a generally U-shaped geometry defined by a central web joined at opposite ends to a pair of generally parallel ribs, said inner strip winding step comprising winding the strip in a radially outwardly open orientation with the ribs of adjacent spiral turns in generally abutting back-to-back relation;

spirally winding an outer strip of thermoplastic material onto the mandrel over the inner strip, the outer strip having an outboard wall joined at its opposite ends to a pair of generally parallel legs, said outer strip winding step comprising winding the outer strip in a radially inwardly open orientation with the outboard wall overlying adjacent ribs of adjacent spiral turns of the inner strip and with the legs disposed in axially outboard positions relative to said adjacent ribs; and laser welding the inner and outer strips together along a continuous line of contact at the juncture of the outboard wall of the outer strip and the underlying adjacent ribs of the inner strip to form the spiral wound hose.

2. The method of claim 1 wherein said spiral winding steps and said laser welding step proceed simultaneously on a continuous basis.

3. The method of claim 1 wherein said laser welding step laser-fuses together the three-component juncture of the adjacent ribs on adjacent spiral inner strip turns and the outboard wall of the outer strip along said continuous line of contact.

4. The method of claim 1 wherein the thermoplastic material for the inner and outer strips is a polyethylene material.

5. The method of claim 1 wherein the inner and outer strips are spirally wound from laterally opposite directions onto the mandrel.

6. The method of claim 5 wherein the inner and outer strips are wound onto the mandrel from generally upwardly open orientations for upward exposure of the three-component juncture of said adjacent ribs on adjacent spiral turns of the inner strip and the outboard wall of the outer strip as the inner and outer strips are wound together.

7. The method of claim 1 further including the step of axially advancing the wound strips along and off the mandrel.

8. The method of claim 1 further including the step of rotating the mandrel during said spiral winding steps to draw the inner and outer strips about the mandrel.

* * * * *